(12) United States Patent
Mangum et al.

(10) Patent No.: US 11,751,005 B2
(45) Date of Patent: Sep. 5, 2023

(54) PROVIDING GRAVE INFORMATION USING AUGMENTED REALITY

(71) Applicant: Ancestry.com Operations Inc., Lehi, UT (US)

(72) Inventors: Gary Lee Mangum, Springville, UT (US); James Bart Whiteley, Provo, UT (US); David Layne Boothe, Eagle Mountain, UT (US); Byron Hundley, Saratoga Springs, UT (US); Russell Adrian Ochoa, Orem, UT (US); Kendall Jay Jefferson, Lindon, UT (US)

(73) Assignee: ANCESTRY.COM OPERATIONS INC., Lehi, UT (US)

( * ) Notice: Subject to any disclaimer, the term of this patent is extended or adjusted under 35 U.S.C. 154(b) by 0 days.

(21) Appl. No.: 17/369,704

(22) Filed: Jul. 7, 2021

(65) Prior Publication Data

US 2021/0334539 A1 Oct. 28, 2021

Related U.S. Application Data

(63) Continuation of application No. 16/262,749, filed on Jan. 30, 2019, now Pat. No. 11,093,746.

(60) Provisional application No. 62/624,310, filed on Jan. 31, 2018.

(51) Int. Cl.
*H04L 67/306* (2022.01)
*H04W 4/02* (2018.01)
(Continued)

(52) U.S. Cl.
CPC .......... *H04W 4/02* (2013.01); *G01C 21/3407* (2013.01); *G01C 21/36* (2013.01); *G06F 3/0482* (2013.01);
(Continued)

(58) Field of Classification Search
CPC ... G01C 21/3407; G01C 21/36; G06F 3/0482; G06F 3/167; H04L 67/306; H04W 4/023; G06V 30/10
See application file for complete search history.

(56) References Cited

U.S. PATENT DOCUMENTS 9,261,598 B1 2/2016 Robinson et al.
2004/0148282 A1* 7/2004 Gardiner ................. G06F 16/29
(Continued)

OTHER PUBLICATIONS

United States Office Action, U.S. Appl. No. 16/262,749, filed Aug. 25, 2020, 15 pages.
(Continued)

*Primary Examiner* — Nhat Huy T Nguyen
(74) *Attorney, Agent, or Firm* — Fenwick & West LLP

(57) ABSTRACT

Augmented reality is used to display graphical elements overlaid on a continually updating image of an area around an augmented reality device (e.g., a mobile device). The graphical element may contain geographical location information about a grave of an ancestor and/or biographical information about the ancestor. The continually updating image is captured by a camera of the augmented reality device and updates in response to time and motion of the augmented reality device. Based on orientation data and geographical location data collected by the augmented reality device, the graphical element is updated and displayed on the mobile device.

18 Claims, 9 Drawing Sheets

(51) Int. Cl.
  *G06F 3/0482*  (2013.01)
  *G06F 3/16*  (2006.01)
  *G01C 21/36*  (2006.01)
  *G01C 21/34*  (2006.01)
  *H04L 65/00*  (2022.01)
  *H04N 21/00*  (2011.01)
  *G06V 20/20*  (2022.01)
  *H04L 67/131*  (2022.01)
  *G06V 30/10*  (2022.01)

(52) U.S. Cl.
  CPC .............. *G06F 3/167* (2013.01); *G06V 20/20* (2022.01); *H04L 65/00* (2013.01); *H04L 67/131* (2022.05); *H04L 67/306* (2013.01); *H04N 21/00* (2013.01); *H04W 4/023* (2013.01); *G06V 30/10* (2022.01); *H04W 4/026* (2013.01)

(56) References Cited

U.S. PATENT DOCUMENTS

| | | | |
|---|---|---|---|
| 2006/0271450 A1* | 11/2006 | Cohen | G06Q 40/12 |
| | | | 705/30 |
| 2013/0259387 A1* | 10/2013 | Gunn | G06V 10/751 |
| | | | 382/218 |
| 2015/0070262 A1 | 3/2015 | Peters et al. | |
| 2015/0127604 A1* | 5/2015 | Gunn | G06Q 30/0201 |
| | | | 707/609 |
| 2016/0284125 A1 | 9/2016 | Bostick et al. | |
| 2017/0154465 A1 | 6/2017 | Calvert | |

OTHER PUBLICATIONS

United States Office Action, U.S. Appl. No. 16/262,749, filed Apr. 3, 2020, 12 pages.

* cited by examiner

| Cancel | Add Memorial | Create |

NAME

Prefix ▼

First

Middle

Last                                    REQUIRED!

Suffix ▼

Nickname

Maiden

BIRTH DATE

YYYY          MM          DD

BIRTH LOCATION

Country ▼       State ▼       City

FIG. 3B

PROVIDING GRAVE INFORMATION USING AUGMENTED REALITY

CROSS-REFERENCE TO RELATED APPLICATION

This application is a continuation of U.S. patent application Ser. No. 16/262,749 filed on Jan. 30, 2019, which claims the benefit of U.S. Patent Application 62/624,310 filed on Jan. 31, 2018, all of which are incorporated herein by reference in their entirety for all purposes.

BACKGROUND

This disclosure relates generally to using augmented reality for displaying information related to geographical location, and more specifically to using augmented reality to display information related to geographical location of a grave.

SUMMARY

Augmented reality (AR) is a simulated environment created by combining computer graphics with the real world as perceived by a user. A typical AR system includes an AR headset that provides augmented views of a physical, real-world environment with computer-generated elements (e.g., images, video, sound, etc.). With recent development in mobile augmented reality, users can experience augmented reality through a mobile device (e.g., tablet, mobile phone) instead of having to purchase AR headsets. In some embodiments, the real-world environment captured through a camera of the mobile device is overlaid with computer-generated elements. The combined augmented reality image is displayed on the display of the mobile device.

Within a cemetery, there can be hundreds of graves, and it can be confusing and time consuming to navigate the cemetery to find a grave of an ancestor. Currently, there are written registries, traditional records, websites, and databases that contain information about the deceased, but it is time consuming to access and make use of the information.

The present disclosure relates to presenting computer-generated graphical elements that are related to a grave overlaid on a continually updating image of real-world environment using augmented reality. The graphical elements may visually provide information such as a geographical location of the grave, an image of the gravestone or an image of an ancestor associated with the grave, a number of years of life of the ancestor, a link to a website associated with the ancestor, and a path to the grave. The continually updating image of the real-world environment captured by the camera of the mobile device is overlaid with the graphical elements. The graphical elements are updated in response to time and motion of the mobile device. The augmented reality provides easy and quick access to information about ancestors buried at cemeteries and helps users navigate to the exact location of selected graves.

BRIEF DESCRIPTION OF THE DRAWINGS

FIGS. 3A to 3G are example illustrations of graphical user interfaces displaying different graphical elements in one or more processes of finding a grave, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. System Architecture

Figure 1:
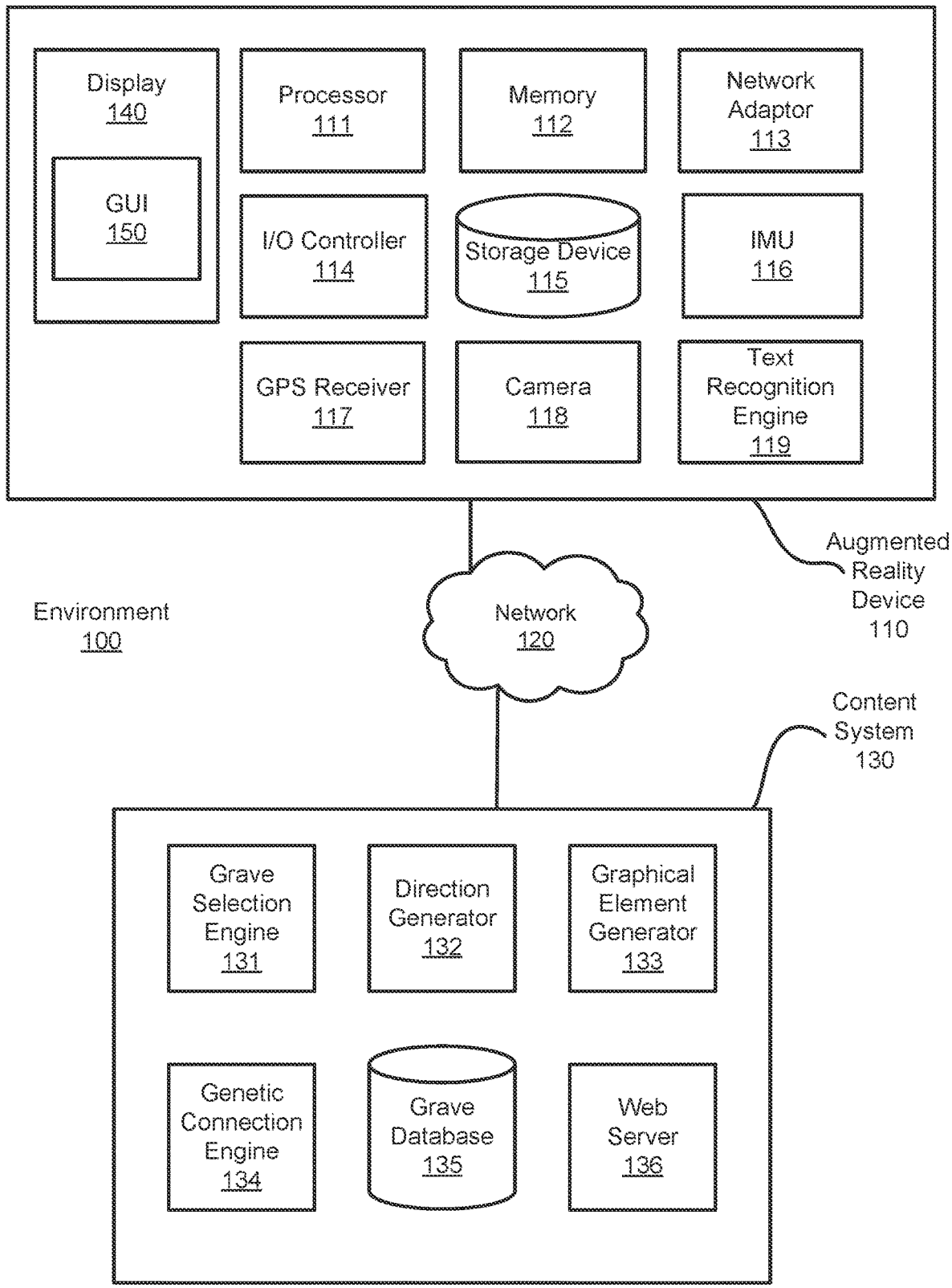
FIG. 1 is a block diagram of a system environment in which an augmented reality device and content system operates, in accordance with an embodiment.

FIG. 1 is a block diagram of a system environment 100 in which an augmented reality device 110 and content system 130 operate, in accordance with an embodiment. The system environment 100 comprises an augmented reality device 110, a network 120, and a content system 130. The augmented reality device 110 communicates with the content system 130 through the network 120. The augmented reality device 110 and the content system 130 can have different and/or other component than those shown in FIG. 1. In addition, the augmented reality device 110 and content system 130 can lack certain illustrated components.

In the discussion below, the augmented reality device 110 is a mobile device (e.g., a smartphone). In other examples, the augmented reality device 110 may be a head mounted display and a controller. Although FIG. 1 illustrates only a single instance of the components of the system environment 100, in practice, more than one of each component may be present, and additional or fewer components may be used. For example, there may be more than one user connected to the network 120 through a plurality of augmented reality devices 110.

The augmented reality device 110 comprises a processor 111, a memory 112, a network adaptor 113, an input/output (I/O) controller 114, a storage device 115, an inertial measurement unit (IMU) 116, a global positioning system (GPS) receiver 117, a camera 118, a text recognition engine 119, and a display 140.

The storage device 115 is any non-transitory computer-readable storage medium, such as a hard drive, compact disk read-only memory (CD-ROM), DVD, or a solid-state memory device. The memory 112 holds instructions and data used by the processor 111. The memory 112 includes high-speed random access memory (RAM), such as DRAM, SRAM, DDR RAM or other random access solid state memory devices. The I/O controller 114 receives input from a touch input surface (capacitive or otherwise), a keyboard, a microphone, a camera, or another form of input device. The network adaptor 113 couples the augmented reality device 110 to the network 120.

The IMU 116 is a data collecting electronic engine that detects an orientation of the augmented reality device 110. The IMU 116 may detect an angular velocity and linear acceleration in up to six degrees of freedom (i.e., x, y, z, yaw, pitch, and roll). The IMU 116 may include one or more accelerometers, one or more gyroscopes, one or more magnetometers, some other sensor that detect movement, of the augmented reality device 110, or some combination thereof.

The GPS receiver 117 is configured to receive information from GPS satellites and calculate the geographical location of the augmented reality device 110. The GPS receiver may provide position and velocity data of the augmented reality device 110 to the content system 130. This definition of GPS receiver 117 is expansive, and also includes chips or components of long term evolution (LTE), 3G, 4G, or other similar wireless communications chip, firmware, and software which can provide geographical location information through wireless communication with one or more remote access points rather than by connecting with GPS satellites specifically.

The camera 118 is configured to capture images and/or record video of a surrounding area of the augmented reality device 110. For purposes of this description, the capture of images at a frame rate and the capture of video are effectively synonymous. As the captured images/video are presented on the display of the AR system as part of the GUI, it is assumed that the video/images are recorded at a sufficient frame rate (e.g., 24 frames per second) so as to provide full-motion video rather than static images. The area captured by the camera 118 encompasses an angular range that is a subset of a 360 degree compass directions that depends on the geometry of the lens of the camera 118. The images captured by the camera 118 may be sent to and stored in the storage device 115.

The text recognition engine 119 receives an image of text from the camera 118. The text recognition engine comprises an optical character recognitions (OCR) algorithm. Generally, such algorithms operate according to various mechanisms. For example, they may compare the image to a database of glyphs on a pixel-by-pixel basis, and/or they may also extract features from the text in the image and compare the image features with stored glyph features and choose the closest match. The text recognition engine 119 may provide the text determined from the image of text to the I/O controller 114. Examples of OCR algorithms that may be used include, but are not limited to matrix matching and feature extraction.

The display 140 is a display assembly such as a monitor, a screen, and near-eye display that provides visual information for the users. The processor 111 may cause the display 140 to visually present different graphical user interfaces (GUIs) 150. For example, the augmented reality device 110 may have various software applications installed. One of the software application is a reality-augmented grave information application that is developed by an entity that operates the content system 130. When a user selects and launches the reality-augmented software application, the processor 111 causes the display 140 to display the GUI 150 of the software application. The software application may also activate the camera 118 and the GUI 150 is configured to continuously display images that are captured by the camera 118 and overlay different graphical elements and information on the images in manners that will be discussed in further details below in FIG. 2 through FIG. 3G.

The network 120 represents the various wired and wireless communication pathways between the augmented reality device 110 and the content system 130. Network 120 uses standard Internet communications technologies and/or protocols. Thus, the network 120 can include links using technologies such as Ethernet, IEEE 802.11, integrated services digital network (ISDN), asynchronous transfer mode (ATM), etc. Similarly, the networking protocols used on the network 120 can include the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

II. Content System Structure

The content system 130 comprises a grave selection engine 131, a direction generator 132, a graphical element generator 133, a genetic connection engine 134, a grave database 135, and a web server 136. Generally, based in part on the information received from the augmented reality device 110, the content system 130 determines a list of graves that are associated with received information, obtains directions to a selected grave, and generates graphical elements presented via the AR system that helps direct a user to the grave.

The grave selection engine 131 receives information from the I/O controller 114 input by a user and/or information from the IMU 116, GPS receiver 117, and camera 118. Based in part on the information received, the grave selection engine 131 queries a grave database 135 for one or more graves that at least partially match or relate to the information received. The grave selection engine 131 sends, in response, a list of graves based on the information to the augmented reality device 110. This information is presented as part of a GUI, allowing the user to provide input to select a particular grave.

The direction generator 132 receives geographical location data of the augmented reality device 110 from the GPS receiver 117 and determines directions describing a path from the current geographical location of the augmented reality device 110 to the geographical location of the selected grave, as provided by the grave database 135. The direction generator 132 also receives continually updating geographical location data from the GPS receiver 117 and continually re-computes the distance between the augmented reality device 110 and the location of the selected grave.

The graphical element generator 133 receives orientation data from the IMU 116 and geographical location data from the GPS receiver 117 and generates graphical elements. Based on the user input, the graphical element generator generates a pin graphical element that contains information about the selected grave. The pin graphical element is continually updated based on orientation data and geographical location data corresponding to the motion of the mobile device. For example, when the user is more than a threshold distance from the selected grave, the pin graphical element is overlaid on the GUI and specifically overlaid on the continually updating image of the area surrounding the mobile device, such that the pin graphical element marks the direction and location of the selected grave is generated relative to the area captured by the continually updating image. When the user is less than a threshold distance from the selected grave, additional information such as the ancestor name, date of birth, date of death, and genetic and genealogical connections may be added to the graphical element.

The genetic connection engine 134 stores genetic and genealogical connections of users. The genetic connection engine 134 may contain family tree information that show relationships among users. The genetic connection engine 134 may also contain DNA information of users.

The grave database 135 contains profiles of graves and information associated with the profiles. Each grave profile is associated with a deceased such as an ancestor and may include information such as a name of the ancestor, a geographical location of the grave, a number of years of life of the ancestor, a picture of the grave, a picture of the ancestor, a link to a website associated with the ancestor, and a name of a family member of the ancestor.

The web server 136 has a large secondary storage, for example, using a RAID (redundant array of independent disks) array and/or by establishing a relationship with an independent content delivery network (CDN) contracted to store, exchange and transmit data. Additionally, the web server 136 includes an operating system, for example, a UNIX operating system, LINUX operating system, or a WINDOWS operating system. The operating system manages the hardware and software resources of the web server 136 and also provides various services, for example, process management, input/output of data, management of peripheral devices, and so on. The operating system provides various functions for managing files stored on a device, for example, creating a new file, moving or copying files, transferring files to a remote system, and so on.

In some embodiments, one or more components of the content system 130 may also be located in the augmented reality device 110. For example, the graphical element generator 133 and the direction generator 132 may also be located in the augmented reality device 110.

III. Augmented Reality Process for Finding a Grave

Figure 2:
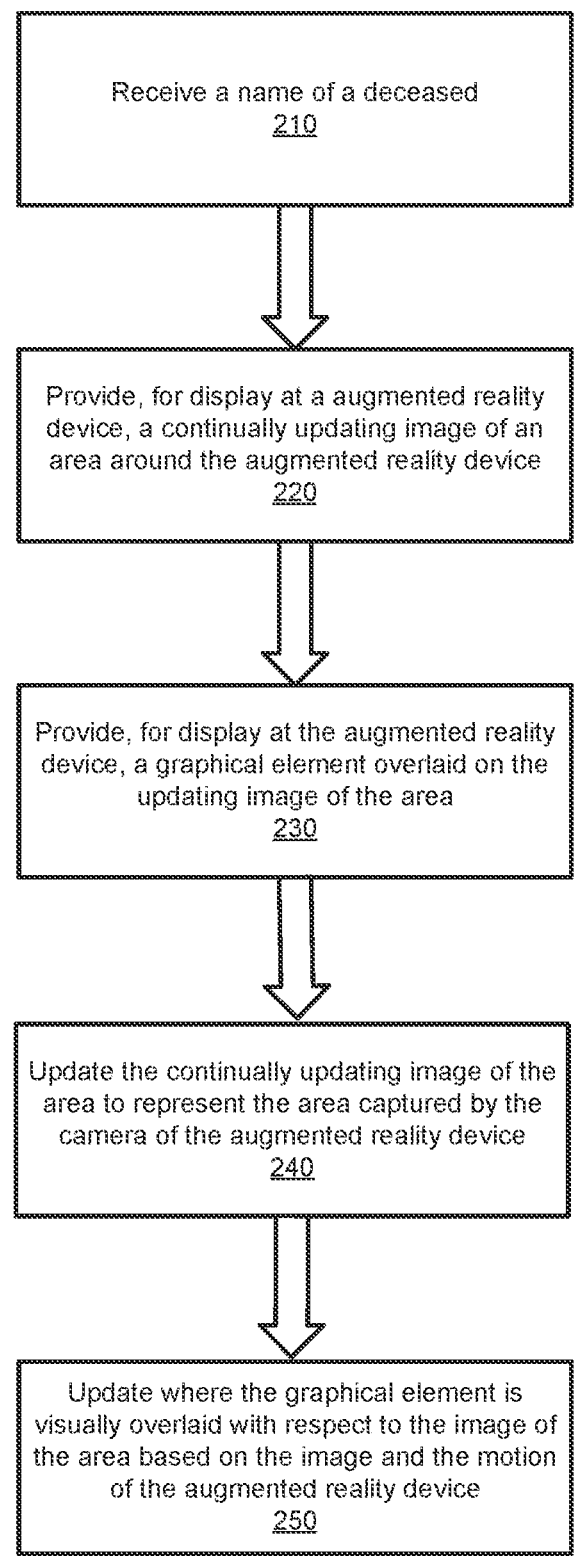
FIG. 2 is a flow chart illustrating a process of finding a grave, in accordance with an embodiment.

FIG. 2 is a flow chart illustrating a process of finding a grave, in accordance with an embodiment. FIG. 3A to 3G are example illustrations of graphical user interfaces displaying different graphical elements in one or more processes of finding a grave, in accordance with an embodiment. FIGS. 2 and 3A-3G are described together below for compactness of description, as the elements of the flowchart of FIG. 2 variously correspond to the elements of the graphical user interface presented in FIGS. 3A-3G. In the following description, where action by a user is referred to, such action corresponds to an input that the device presenting a graphical user interface is configured to receive and interpret, and which corresponds to a graphical element that the GUI presents to the user on the display screen of the device.

In an example process depicted in FIG. 2, the augmented reality device 110 receives 210 a name of a deceased from a user. The augmented reality device 110 provides 220 a continually updating image of an area around the augmented reality device. The augmented reality device provides 230 a graphical element overlaid on the updating image of the area. The augmented reality device updates 230 the continually updating image of the area to represent the area captured by the camera of the augmented reality device. The augmented reality device updates 250 where the graphical element is visually overlaid with respect to the image of the area based on images captured by the camera and/or the motion of the augmented reality device 250. Details of this example process and variation in different embodiments will be further discussed below in association with FIGS. 3A-3G.

The augmented reality device 110 presents for display a GUI that allows a user to enter an ancestor name and a cemetery name. The GUI displays input fields for receiving user input such as first and last name of the ancestor, date of birth of the ancestor, date of death of the ancestor, nickname of the ancestor, and birth location of the ancestor. The input may be a text entry from a keyboard or a voice entry from a microphone. The content system 130 searches the grave database 135 for graves that match the received ancestor name and cemetery name.

The content system 130 may also search the grave database 135 for graves based on the geographical location information from the GPS receiver 117. For example, if the geographical location information indicates that the current location of the augmented reality device 110 is in a particular cemetery (e.g., Arlington National Cemetery), the content system 130 searches the grave database 135 for graves that are in the cemetery. In another example, the user searches for graves that share genetic and genealogical connection with the user. The GUI display may also offer search suggestions based on searches made by other users of the content system 130. For example, the user may be given the option to search for graves recently searched by other users that share genetic and genealogical connection with the user or popular graves searched by other users that are associated with the same geographical area as the user.

In response to the search query, the grave selection engine 131 sends a list of the graves to the augmented reality device 110 through the network 120. The augmented reality device 110 displays the list of the graves, and the user selects a grave of interest. The GUI is further described below in reference to FIG. 3A. The selection is sent to the direction generator 132 through the network 120. The direction generator 132 determines directions from the location of the augmented reality device 110 and the selected grave. Using the directions, the graphical element generator 133 generates a path graphical element to be displayed on the augmented reality device 110.

Figure 3A:
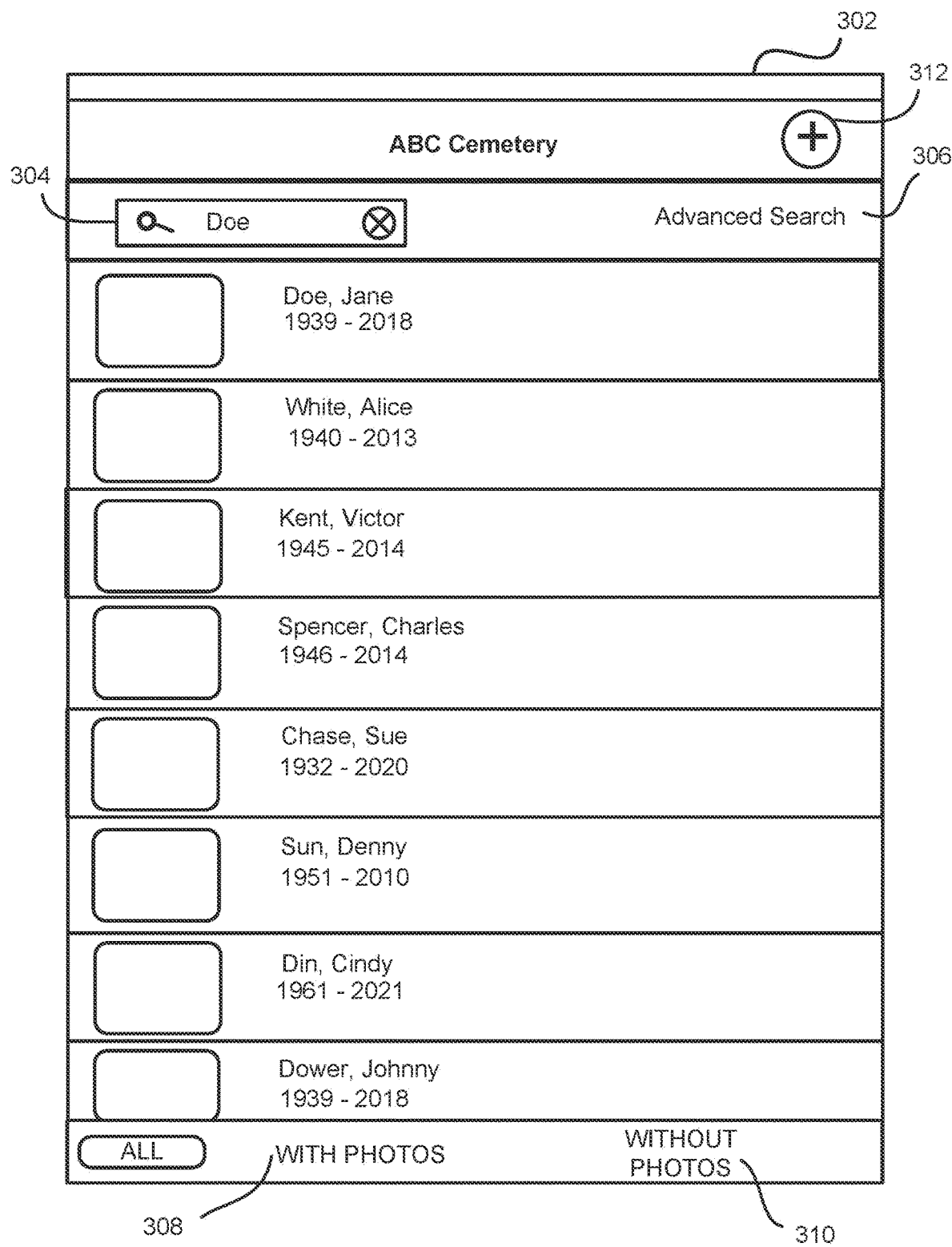

FIG. 3A is an example illustration of a graphical user interface (GUI) that shows search results for a grave within a cemetery. In FIG. 3A, a GUI 302 used to search for a grave associated with an ancestor name within a cemetery is shown. In one embodiment, the GUI 302 may correspond to the GUI 150 shown in FIG. 1. The user searches for an ancestor name within a selected cemetery by entering the ancestor name into a search field 304. The user may enter additional information to reduce a number of search results. The user may select the "Advanced Search" option 306 and input additional information about the ancestor such as a date of birth, a date of death, a city that the ancestor was born in, a city that the ancestor died in, a name of a family member, and a cause of death.

The user may select how to be presented with the search results within the GUI 302. As shown in FIG. 3A, the user may select "With Photos" 308 to be presented with a thumbnail of an associated image next to the name and year of the deceased. The user may also select "Without Photos" 310 to see the search results without the associated image.

The user may not find the grave of interest and create a new grave profile by interacting with the new profile graphical element 312. The user may enter an ancestor name and a cemetery name which does not match with any of the graves in the grave database 135. In this instance, the user may be directed to create a new grave profile by adding information such as a picture of the grave, a location of the grave, a name of a family member. The creation of a new grave profile is further described below in reference to FIGS. 3B, 3C, and 3D.

FIG. 3B is an example illustration of a GUI that shows creating a new grave profile. When the user does not find the grave of interest associated with the ancestor name, the user may create the new grave profile and add missing information. The user may enter information into the input fields using a text entry and a voice entry. The user may capture an image of the gravestone that contains information about the ancestor and run a text recognition software to automatically enter the information (auto-fill) as further described below in reference to FIG. 3C.

Some input fields may be required to create the new grave profile, and if the user tries to create the new grave profile without adding information to the required input fields, the user may be prevented from creating the new grave profile and receive a warning message. In the example shown in FIG. 3B, a last name is required for creating a new grave profile. If the user attempts to create the new grave profile without entering information into the last name field, the user may be presented with a warning message and led back to the last name field.

Although not shown in FIG. 3B, the user may be directed to add geographical location information of the new grave profile. In one example, the augmented reality device 110 may display a map of the cemetery and receive as user input, a movable pin graphical element that is placed on the geographical location of the new grave profile. In another example, the user may receive geographical location from the GPS receiver of the augmented reality device 110 and use the geographical location of the augmented reality device 110 as the geographical location of the new grave profile when close to the grave (e.g., less than 5 ft).

Figure 3C:
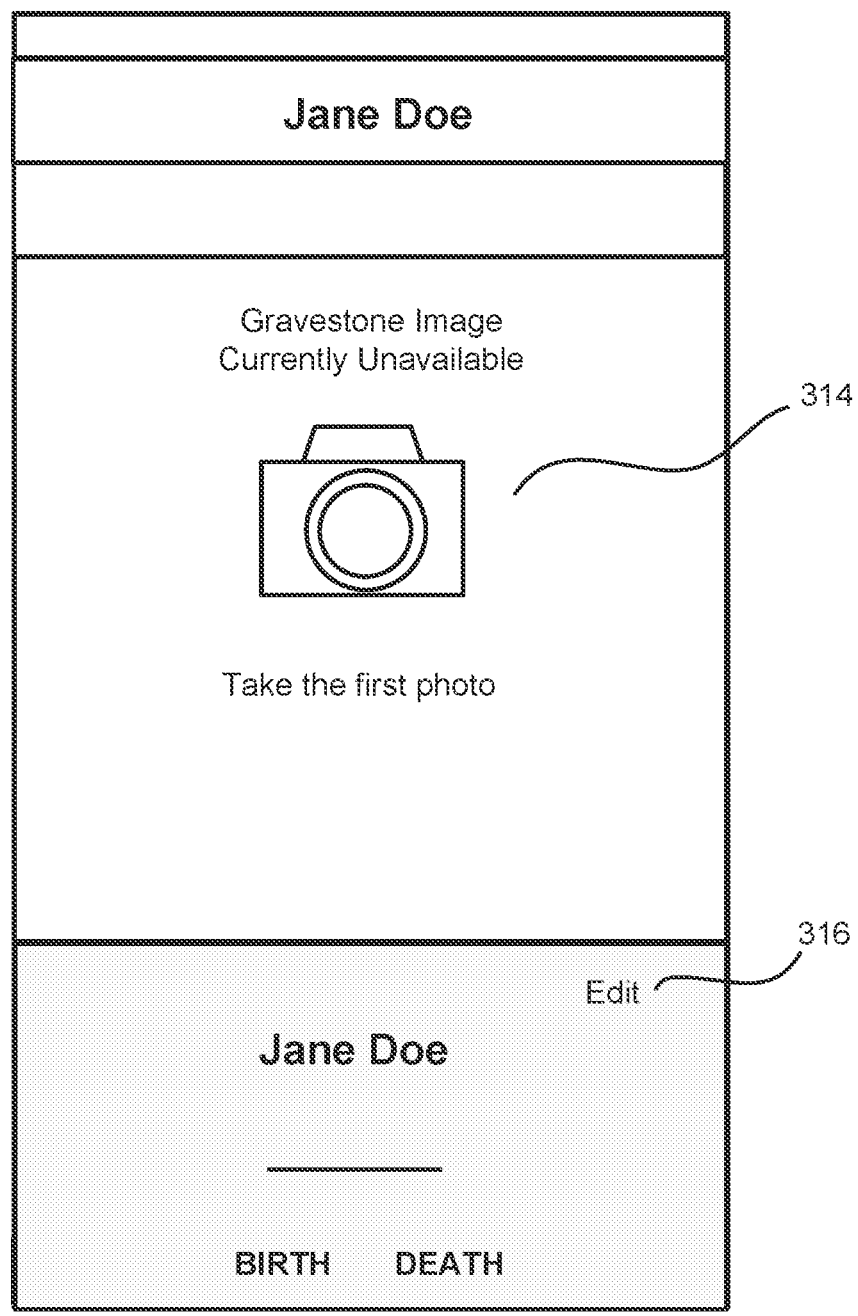

FIG. 3C shows the GUI 302 displaying a grave profile that does not have an associated image, date of birth, and date of death. The GUI 302 may display a graphical element with the text "Gravestone Image Currently Unavailable" to indicate that the content system 130 does not have any photo of associated with the graph profile. The user may be directed to take a picture of the gravestone to add to the grave profile. For example, the GUI 302 may display a camera graphical element 314 that causes the camera 118 of the augmented reality device 110 to run responsive to the user interacting with the camera graphical element 314. When the user takes a picture of the gravestone, the picture is saved in the grave profile. The user may also interact with the edit graphical element 316 to add information to the grave profile or edit incorrectly entered information on the grave profile.

Figure 3D:
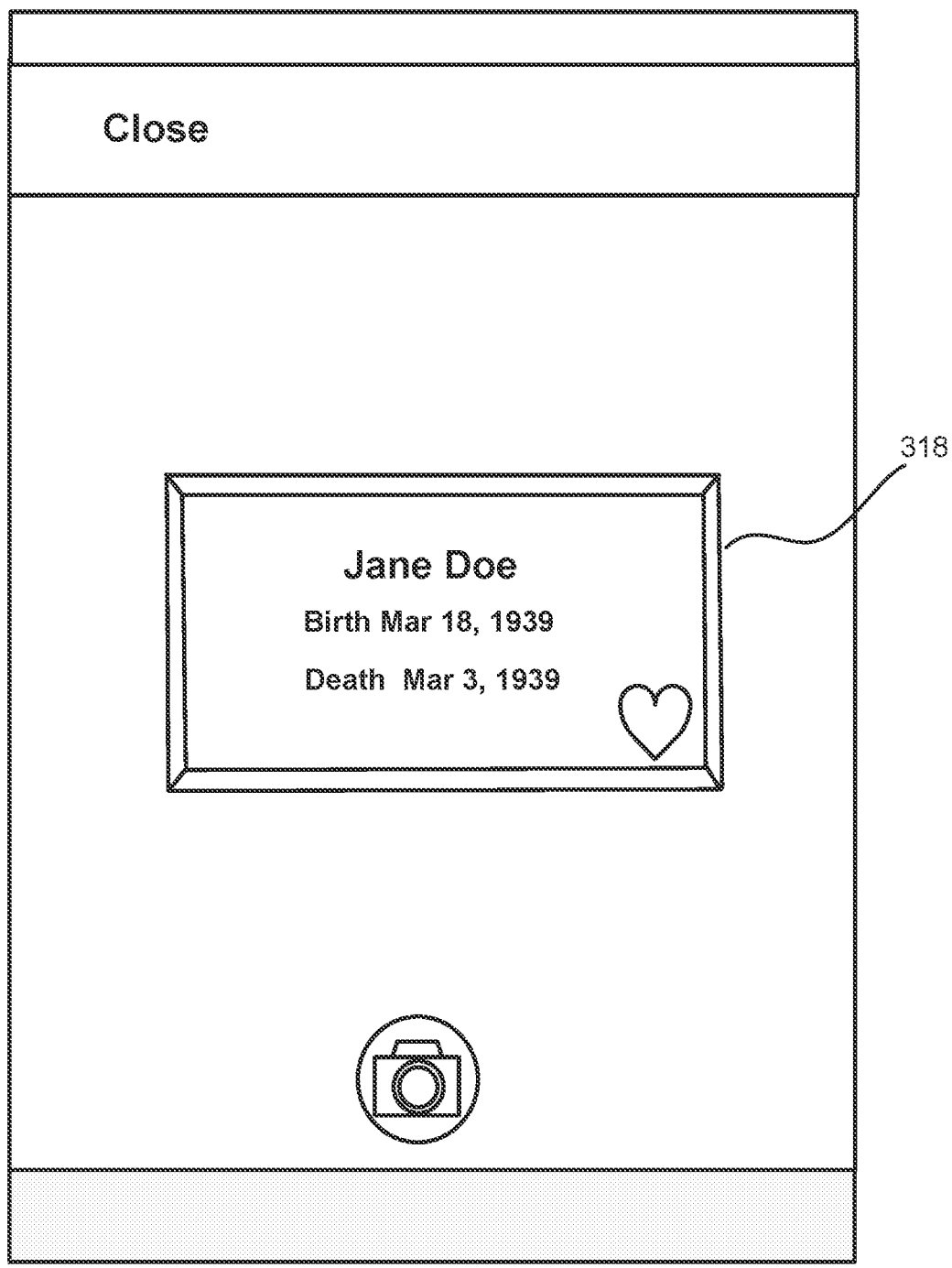

FIG. 3D is an example illustration of a GUI 302 displaying an actual image of a gravestone 318 that is captured by the camera 118. The GUI 302 may use text recognition to identify information printed or engraved on a gravestone. The text recognition feature may be used to identify a new gravestone profile to extract information on a newly captured gravestone or to identify/verify an existing gravestone profile that is stored in the content system 130. For example, a user may direct the camera 118 of the augmented reality device 110 towards the gravestone 318 and captures an image of the gravestone 318. The text recognition engine 119 runs a text recognition software that extracts text from the image of the gravestone 318. The extracted text may be used to automatically enter information into the input fields of the new grave profile.

In the example shown in FIG. 3D, the text recognition software may extract the name "Jane Doe," date of birth "Mar. 18, 1939" and date of death "Mar. 13, 1939" engraved in the grave stone 318. After extracting the text, the text recognition engine 119 may ask the user to verify that the extracted text is accurate. If the extracted text is not accurate, the user may edit the incorrect fields before entering information into the new grave profile.

In one embodiment, information extracted by the text recognition, along with other types of information, allows an augmented reality device 110 to register a new gravestone profile or to retrieve, locate and confirm a gravestone whose profile is stored in the content system 130. For example, the augmented reality device 110 captures an ancestor name using text recognition but not a cemetery name. The GPS receiver 117 sends the geographical information of the augmented reality device 110 to the content system 130. The content system 130 determines a list of cemeteries that are within a threshold distance of the geographical location of the augmented reality device 110. The user may define the threshold distance into the GUI 302 (e.g., 5 miles, 10 miles, 15 mile). The grave database 135 determines a list of graves that are associated with the received ancestor name from the cemeteries that are located within the threshold distance from the geographical location of the augmented reality device 110.

In another example, the user requests graves of known ancestors that are connected to the user. Based on the genetic and genealogical information stored in the genetic connection engine 134, the content system 130 determines a list of graves that are connected to the user. The content system 130 may also receive geological information of the augmented reality device 110 from the GPS receiver 117 and present a partial list of graves that are connected to the user and located within a threshold distance from the geographical location of the augmented reality device 110.

III.A. GUI Contents

The AR GUI for providing directions towards a selected grave includes a continually updating image of an area around the mobile device, as captured by the camera 118. The AR GUI further includes display of a pin graphical element overlaid on the updating image of the area. An example of a pin graphical element overlaid on the updating image of the area when an augmented reality device 110 is more than a threshold distance away from a selected grave is shown in FIG. 3E.

Figure 3E:
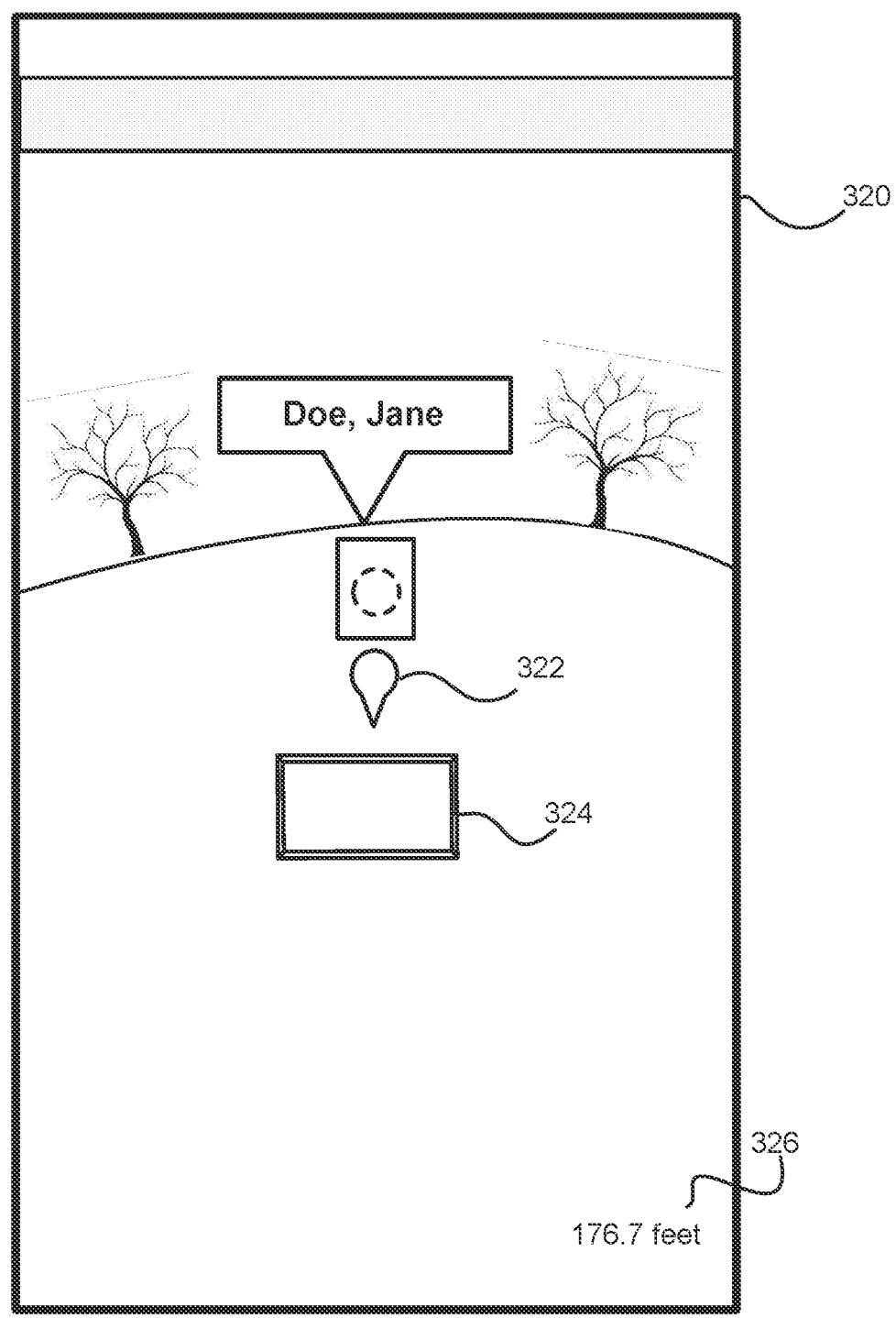

FIG. 3E is an example illustration of a GUI that shows an image of the area, a pin graphical element marking a geographical location of a selected grave. The user holding the augmented reality device 110 directs the camera 118 of the augmented reality device 110 such that a continually updating image 320 of an area around the augmented reality device 110 encompasses an angular range that contains the geographical location of the selected grave 324. The GPS receiver provides geographical location of the augmented reality device 110, and the direction generator 132 calculates the distance between the geographical location of the augmented reality device 110 and the geographical location of the selected grave 324. A distance graphical element 326 showing the calculated distance is displayed on the augmented reality device 110 and updated in response to movement of the user holding the augmented reality device 110. The calculated distance may be an absolute distance between the two geographical locations or may be based on the path from the geographical location of the augmented reality device 110 to the selected grave 324. Although not shown in FIG. 3E, a path graphical element may provide the user with visual directions from the user's geographical location to the geographical location of the selected grave 324.

In FIG. 3E, the user is more than a threshold distance away from the selected grave. The pin graphical element 322 displays the name of the ancestor of the selected grave 324 and the geographical location of the selected grave 324. When the user is more than the threshold distance away from the selected grave 324, the pin graphical element 322 may be smaller, a different color, and contain less information compared to the pin graphical element 322 that is displayed when the user is less than the threshold distance away.

In one example, the user directs the camera 118 of the augmented reality device 110 in a direction such that the area captured by the camera 118 does not encompass the location of the selected grave 324. A direction graphical element may be overlaid on the continually updating image to orient the user in the direction of the selected grave 324, even though the direction (e.g., cardinal direction) of the selected grave 324 is outside the angular field of view captured by the camera 118. This direction graphical element may the same as the pin graphical element 322, or a different graphical element such as an arrow. When the user moves in the direction of the arrow such that the continually updating image captured by the camera 118 includes the geographical location of the selected grave 324, the pin graphical element 322 visually marking the geographical location of the selected grave 324 is overlaid on the continually updating image and displayed on the augmented reality device 110. This may be accomplished by visually morphing the arrow into the pin graphical element 322, or by simply changing which graphical element is shown.

In another example, the graphical element generator 133 receives directions describing a path from the geographical location of the augmented reality device 110 to the selected grave 324 from the direction generator 132 and generates a path graphical element corresponding to the path. The path graphical element connects the location of the augmented reality device 110 to the selected grave 324 while avoiding physical obstructions such as surrounding graves, trees, buildings, and construction zones.

In addition, options for interactive activities may be displayed. The interactive activities may be trivia, a poll, and a game. For example, if a user is in proximity to a grave of a celebrity, a fact about the celebrity may appear on the display.

III.B. AR GUI Movement and Motion Updating.

As the user moves towards (or away from) the selected grave 324 to which they are being directed, the AR device 110 updates 250 the GUI in response to that movement. Specifically, this includes augmented reality device 110 updates 250 where the pin is visually overlaid with respect to the image of the area based on the motion of the mobile device 350.

The direction generator 132 continually receives geographical location information from the GPS receiver 117, and the graphical element generator 133 adjusts the graphical element that displays the distance between the augmented reality device 110 and the selected grave 324 based on the updated distance information received from the direction generator. The direction generator 132 also updates the directions from the augmented reality device 110 and the selected grave 324. The path graphical element representing the directions may get shorter or change in color as augmented reality device 110 approaches the selected grave 324.

The IMU 116 collects data such as angular velocity and linear acceleration data that corresponds to the movement of the augmented reality device 110. As the augmented reality device 110 receives continually updating graphical elements generated by the graphical element generator 133, the augmented reality device 110 updates the display. Based on the motion of the augmented reality device 110, the augmented reality device 110 adjusts how graphical elements are presented with respect to the image of the area. Examples of how the graphical elements are placed and oriented when the distance between the augmented reality device 110 and the selected grave 324 is less than the threshold distance are discussed below with respect to FIGS. 3F and 3G.

In one example, the augmented reality device 110 receives the geographical location of the selected grave 324 and the directions from the current location of the augmented reality device 110 to the location of the selected grave 324. The IMU 116 of the augmented reality device 110 determines the orientation of the augmented reality device 110. In one example, the user faces the opposite direction of the selected grave 324 (e.g., 180 degrees relative to the selected grave 324) and the continually updating image does not include the pin graphical element 322 that is overlaid over selected grave 324. While the direction of the selected grave 324 is outside the angular field of view captured by the camera 118, a graphical element (e.g., an arrow) may be displayed over the continually updating image to direct the user in the direction of the selected grave 324.

The camera 118 of the augmented reality device 110 updates images of the area over time and responsive to motion of the augmented reality device 110. The augmented reality device 110 displays the appropriate graphical elements overlaid on the continually updating images of the area around the augmented reality device 110. Based in part on the data from the IMU 116 and the GPS receiver 117, the graphical element generator 133 may update the placement of the graphical elements. For example, when the user turns to the left, the continually updating images and the graphical elements shifts to the right on the display of the augmented reality device 110 responsive to the movement. Similarly, when the user turns to the right, the continually updating images and the graphical elements shift to the left on the display of the augmented reality device 110. When the direction of the selected grave 324 is within the angular field of view captured by the camera 118, the direction graphical element that was used to direct the user may disappear and the pin graphical element 322 marking the geographical location of the selected grave 324 may appear on the continually updating image.

The continually updating images of the area may include additional pin graphical elements 322 that are overlaid on additional graves that are located within the area encompassing the angular range of the captured images. The user may select a different grave by providing touch input to one of the additional pin graphical elements 322. Based on the selection, the direction generator 132 determines new directions from the geographical location of the augmented device 110 and the newly selected grave. The graphical element generator 133 updates the path graphical element and pin graphical element 322 to include information about the newly selected grave.

When the user is closer than a threshold distance from the selected grave 324, the pin graphical element 322 may include additional information associated with the selected grave 324. The additional information may include a number of years of life, a picture of the selected ancestor, a picture associated with the grave, a link to a website associated with the ancestor, and a name of a family member related to the selected ancestor.

Further, when the user is closer than the threshold distance from the selected grave 324, the augmented reality device 110 may be configured to display different types of information associated with the profile of the selected grave 324 on the pin graphical element 322 augmented on the continually updating images of the area around the selected grave. Based on a portion of a gravestone associated with the selected grave 324 that is captured in the continually updating image, a different section of the pin graphical element 322 may be displayed. For example, the user may turn the mobile device to a first direction so that the camera 118 captures a first portion of the gravestone. The content system 130 may analyze the images captured in real time. In response to the camera 118 capturing the first portion of the gravestone, the content system 130 may overlay a first portion of the pin graphical element 322 on the captured image that is currently being displayed by the augmented reality device 110 at a first position relative to the first portion of the gravestone(e.g., a top portion of the target gravestone). The graphical element generator 133 may generate a downward-pointing indicator that provides an indication to the user that the gravestone being captured by the camera 118 is associated with the selected grave 324. The indicator arrow may be positioned at the space that is above the top portion of the gravestone.

Figure 3F:
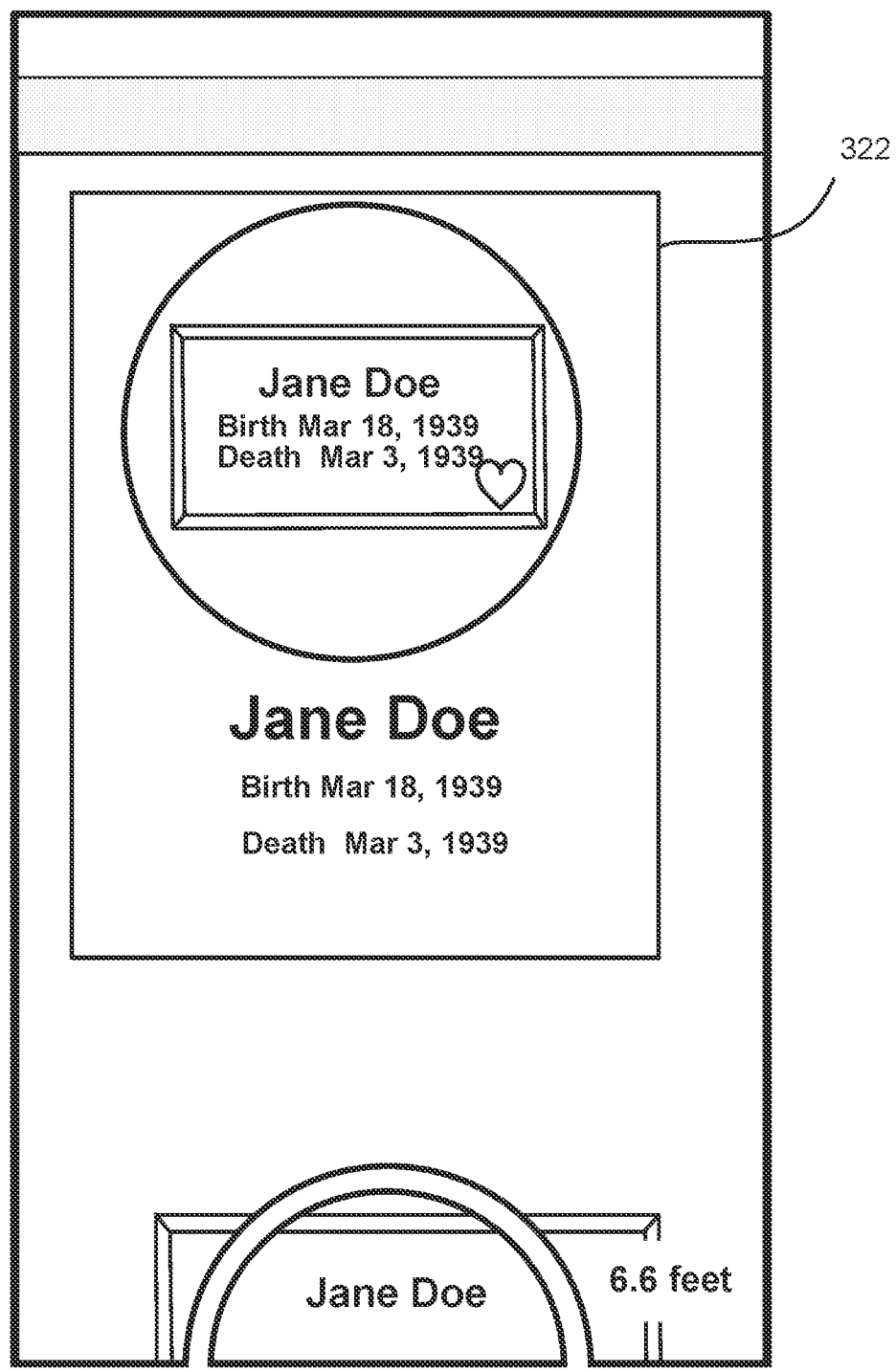

FIG. 3F is an example illustration of a GUI that shows the pin graphical element 322 of the selected grave 324 from a first orientation at close distance. In FIG. 3F, the user holding the augmented reality device 110 is less than a threshold distance away from the selected grave 324. As the user approaches the location of the selected grave 324, the pin graphical element 322 changes (e.g., different color, different size, additional information). For example, compared to the pin graphical element 322 in FIG. 3E which only displays a name of the ancestor, there is more information displayed within the pin graphical element 322 in FIG. 3F. In addition to the name of the ancestor of the selected grave 324, a date of birth, a date of death, and an image of the grave stone is shown in the pin graphical element 322. Although not shown in FIG. 3F, the graphical element may include genetic and genealogical information shared between the user and the ancestor associated with the selected grave 324 (e.g., percentage of shared DNA, common relatives).

The user in FIG. 3F holds the augmented reality device 110 at the first orientation (e.g., the camera 118 pointed towards the sky) and the displayed pin graphical element 322 is a first portion of the graphical element and is tilted at a first angle. The lower portion of the pin graphical element 322 is not shown on the augmented reality device 110. The pin graphical element 322 may be stationary and the portion displayed on the augmented reality device 110 may be based on the orientation of the augmented reality device 110 relative to the pin graphical element 322. In one example, the user in FIG. 3F turns the augmented reality device 110 towards the right by 90 degrees. As the user turns toward the right, the pin graphical element 322 shifts towards the left on the continually updating image on the augmented reality device 110, relative to the user, responsive to the user's movement. In one example, the pin graphical element 322 may remain in a same position relative to the selected grave 324 such that a portion of the pin graphical element 322 moves off the frame of the continually updating image based on the user's movement. When the user's movement causes direction of the selected grave 324 to be at the outer edge of the angular field of view captured by the camera 118, a portion of the pin graphical element 322 (e.g., right half) may be displayed.

Figure 3G:
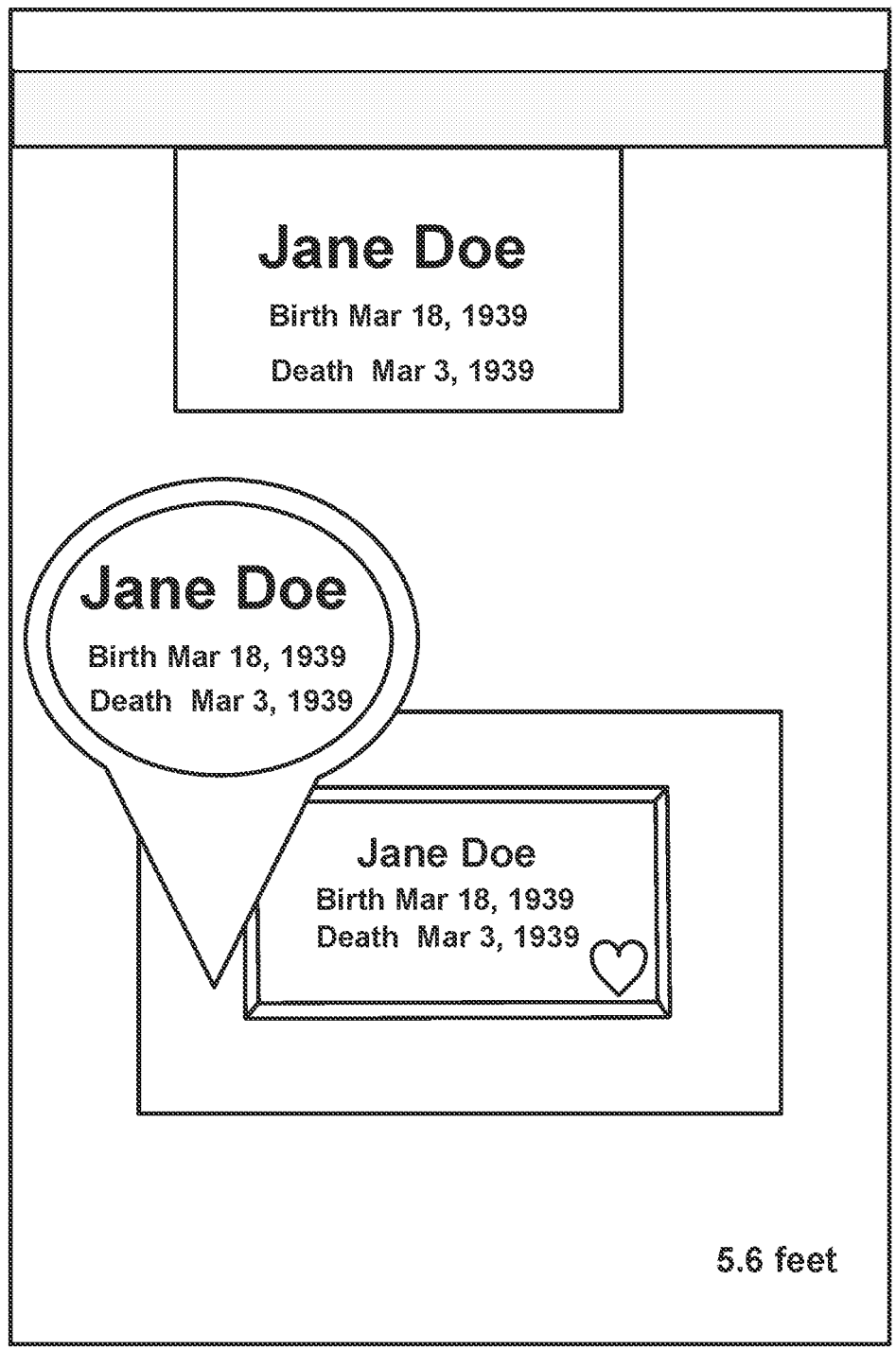

FIG. 3G is an example illustration of a GUI that shows the pin graphical element 322 of the selected grave 324 from a second orientation at a close distance. In FIG. 3G, the user holds the augmented reality device 110 at the second orientation (e.g., the camera 118 pointed towards the ground). The displayed graphical element is a second portion of the pin graphical element 322 and is tilted at a second angle different from the pin graphical element 322 in FIG. 3F. The second portion of the graphical element that is displayed in FIG. 3G is the lower portion of the pin graphical element 322. Although not shown in FIG. 3G, an additional graphical element such as an upward-pointing indicator may be displayed to the user to direct the user to move the augmented reality device 110 upward to access additional information not shown in the second portion of the graphical element.

IV. Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A computer-implemented method comprising:
   receiving an image of a grave captured by a mobile electronic device, the image including at least a portion of a grave marker;
   extracting, information from the image comprising a name of a person and at least one date captured in the portion of the grave marker;

accessing a database of grave profiles and determining a presence of the extracted name within the database in association with the at least one date captured from the portion of the grave marker, determining the extracted name is associated with an existing grave profile in the database of grave profiles;

determining the existing grave profile does not provide a cemetery name;

determining a location of the mobile electronic device is within a threshold distance of one or more cemeteries; and adding a cemetery name to the existing grave profile selected from the one or more cemeteries that contains the grave.

2. The computer-implemented method of claim 1, further comprising:

extracting a second name from a second image;

creating a new grave profile for the extracted second name, wherein the grave profile did not previously exist within the database; automatically populating one or more text fields of the new grave profile with the extracted second name and the at least one date; and causing an edit field to be displayed at the mobile electronic device for facilitating text editing of the automatically populated one or more text fields.

3. The computer-implemented method of claim 2, further comprising: receiving a location of the grave from the mobile electronic device; and adding the location to the new grave profile.

4. The computer-implemented method of claim 3, wherein the location is determined by a GPS module of the mobile electronic device or received through an interface displayed on the mobile electronic device; and wherein the received location is configured as a movable graphical element to be overlaid onto a map of a cemetery where the grave is located.

5. The computer-implemented method of claim 1, wherein determining the location of the mobile electronic device comprises:

calculating a distance threshold around the determined location;

causing one or more cemeteries within the calculated distance threshold to be displayed at the mobile electronic device.

6. The computer-implemented method of claim 1, further comprising:

adding the determined location of the mobile electronic device to the existing grave profile.

7. The computer-implemented method of claim 1, further comprising:

causing the existing grave profile and an edit field to be displayed at the mobile electronic device for facilitating text editing of one or more text fields of the existing grave profile.

8. A hardware storage device having stored thereon computer readable media comprising instructions that, when executed by one or more processors, cause the one or more processors to perform at least the following:

receive an image of a grave captured by a mobile electronic device, the image including at least a portion of a grave marker;

extract, information from the image comprising a name of a person captured in the portion of the grave marker and at least one date pertaining to the person;

access a database of grave profiles and determine a presence of the extracted name within the database in association with the at least one date captured from the portion of the grave marker;

determine the extracted name is associated with an existing grave profile in the database of grave profiles;

determine the existing grave profile does not provide a cemetery name;

determine a location of the mobile electronic device is within a threshold distance of one or more cemeteries; and add a cemetery name to the existing grave profile selected from the one or more cemeteries that contains the grave.

9. The hardware storage device of claim 8, wherein, when executed, the instructions further cause the one or more processors to perform at least the following: extract a second name from a second image; create a new grave profile for the extracted second name, wherein the new grave profile did not previously exist within the database; automatically populate one or more text fields of the new grave profile with the extracted second name and the at least one date; and cause an edit field to be displayed at the mobile electronic device for facilitating text editing of the automatically populated one or more text fields.

10. The hardware storage device of claim 9, wherein, when executed, the instructions further cause the one or more processors to perform at least the following: receive a location of the grave from the mobile electronic device; and add the location to the new grave profile.

11. The hardware storage device of claim 10, wherein the location is determined by a GPS module of the mobile electronic device or received through an interface displayed at the mobile electronic device; and wherein the received location is configured as a movable graphical element to be overlaid onto a map of a cemetery where the grave is located.

12. The hardware storage device of claim 8, wherein, when executed, the instructions further cause the one or more processors to perform at least the following:

calculate a distance threshold around the determined location;

cause one or more cemeteries within the determined distance threshold to be displayed at the mobile electronic device.

13. The hardware storage device of claim 12, wherein, when executed, the instructions further cause the one or more processors to perform at least the following:

add the determined location of the mobile electronic device to the existing grave profile.

14. A system comprising:

one or more processors;

one or more computer readable storage media comprising instructions that, when executed by the one or more processors, configure the system to perform at least the following: receive an image of a grave captured by a mobile electronic device, the image including at least a portion of a grave marker; extract, information from the image comprising a name of a person and at least one date captured in the portion of the grave marker;

access a database of grave profiles and determine a presence of the extracted name within the database in association with the at least one date captured from the portion of the grave marker;

determine the extracted name is associated with an existing grave profile in the database of grave profiles;

determine the existing grave profile does not provide a cemetery name;

determine a location of the mobile electronic device is within a threshold distance of one or more cemeteries; and add a cemetery name to the existing grave profile selected from the one or more cemeteries that contains the grave.

15. The system of claim 14, further configured to perform at least the following: extracting a second name from a second image; create a new grave profile for the extracted second name, wherein the new grave profile did not previously exist within the database; automatically populate one or more text fields of the new grave profile with the extracted second name and the at least one date; cause an edit field to be displayed at the mobile electronic device for facilitating text editing of the automatically populated one or more text fields; receive a location of the grave from the mobile electronic device; and add the location to the new grave profile; wherein the location is determined by a GPS module of the mobile electronic device or received through an interface displayed on the mobile electronic device; and wherein the received location is configured as a movable graphical element to be overlaid onto a map of a cemetery where the grave is located.

16. The system of claim 14, further configured to perform at least the following:
cause one or more cemeteries within the determined distance threshold to be displayed at the mobile electronic device.

17. The system of claim 14, further configured to perform at least the following:
add the determined location of the mobile electronic device to the existing grave profile.

18. The system of claim 14, further configured to perform at least the following:
cause the existing grave profile and an edit field to be displayed at the mobile electronic device for facilitating text editing of one or more text fields of the existing grave profile.

* * * * *